No. 11,927. Reissued Aug. 20, 1901.

T. V. ALLIS.

APPARATUS FOR HOT ROLLING METAL TO THIN GAGES.

(Application filed Apr. 27, 1901.)

3 Sheets—Sheet 1.

Witnesses
John Smith Jr.
Alex H. Milligan

Thomas V. Allis
Inventor

By his Attorney
Chas. H. Jordan

No. 11,927. Reissued Aug. 20, 1901.

T. V. ALLIS.

APPARATUS FOR HOT ROLLING METAL TO THIN GAGES.

(Application filed Apr. 27, 1901.)

3 Sheets—Sheet 2.

Witnesses
John Smith Jr.
Alex H. Milligan

Thomas V. Allis
Inventor

By his Attorney
Thos. M. Forbes

No. 11,927. Reissued Aug. 20, 1901.

T. V. ALLIS.

APPARATUS FOR HOT ROLLING METAL TO THIN GAGES.

(Application filed Apr. 27, 1901.)

3 Sheets—Sheet 3.

Witnesses
John Smith Jr.
Alex H. Milligan

Thomas V. Allis
Inventor

By his Attorney
Chas. M. Corbin

UNITED STATES PATENT OFFICE.

THOMAS V. ALLIS, OF BRIDGEPORT, CONNECTICUT.

APPARATUS FOR HOT-ROLLING METAL TO THIN GAGES.

SPECIFICATION forming part of Reissued Letters Patent No. 11,927, dated August 20, 1901.

Original No. 641,428, dated January 16, 1900. Application for reissue filed April 27, 1901. Serial No. 57,632.

*To all whom it may concern:*

Be it known that I, THOMAS V. ALLIS, a citizen of the United States, and a resident of Bridgeport, in the county of Fairfield and State of Connecticut, have invented certain new and useful Improvements in Hot-Rolling Metal to Thin Gages, of which the following is a specification.

My invention provides an improved apparatus in the art of reducing metal to thin gages by which greater efficiency is effected in the operation and greater reduction possible than heretofore, all as hereinafter set forth.

Figure 1:
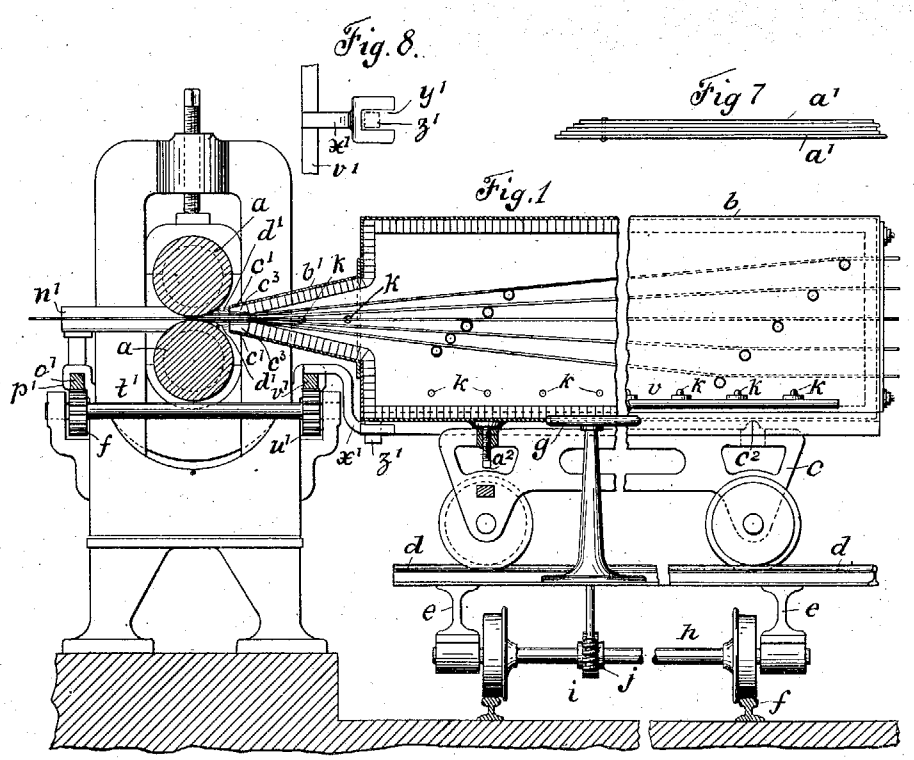
Figure 2:
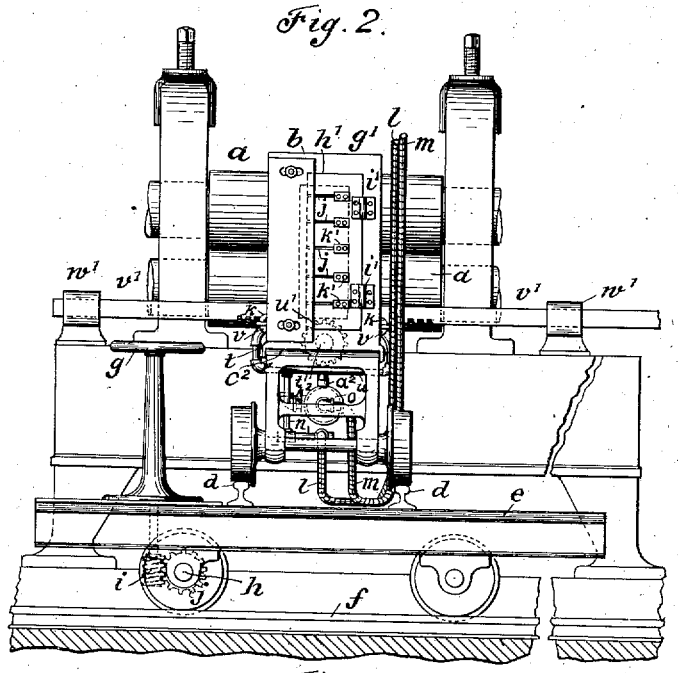
Figure 3:
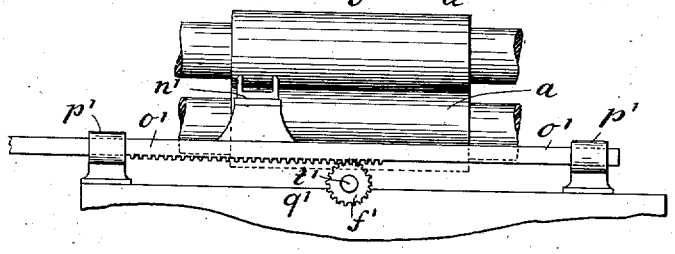
Figure 4:
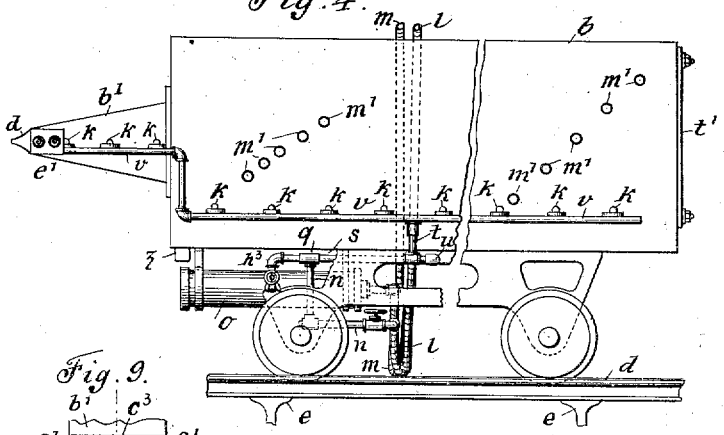
Figure 9:
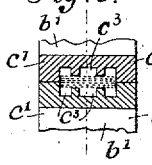
Figure 5:
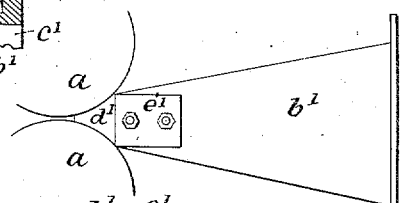
Figure 6:
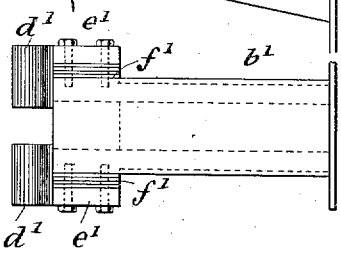

In the accompanying drawings, forming part of this specification, Figure 1 is mainly a sectional and partly a side elevation of the greater portion of my improved apparatus, the section being taken in the plane of the feedway through the rolls. Fig. 2 is an elevation as seen looking from the right hand of Fig. 1. Fig. 3 is an elevation in part as seen looking from the left hand of Fig. 1. Fig. 4 is a side elevation of the furnace separate from the rolls. Fig. 5 is a diagram of the side of the feedway for strips or bars passing from the main part of the furnace into the rolls, also broken outlines of the rolls on an enlarged scale. Fig. 6 is a plan view of said feedway. Fig. 7 is a side view of a pack of strips prepared for reduction together when it is desired to roll very thin material. Fig. 8 is a detail of the guide-shifting attachment. Fig. 9 is an end view of the guide extension of the furnace without the edge-guides.

In front of a suitable rolling-mill *a* I arrange a comparatively long furnace *b* for heating the strips or bars to be reduced as they pass through it into the rolls, said furnace being adjustably mounted on a track *d*, that it may be moved to and from the mill to facilitate repairs, change of rolls, guides, &c. The track *d* is mounted on a truck *e*, placed on rails *f*, whereon the furnace may be moved laterally and parallel with the axes of the rolls to change the position of the guide from time to time that the rolls may become equally heated, expanded, and their surfaces evenly worn.

The furnace may be pushed forward and backward along the track *d* by hand; but any approved apparatus may be used for working it to better advantage. To facilitate the lateral movement of the truck *e*, I have represented a hand-wheel *g* mounted on said truck *e* and geared with one of the axles *h* by a worm *i* and worm-wheel *j*.

The apparatus embodying my invention is for reducing very long and predetermined width of strips to thin gages by one and not several passes through the rolls. Such strips must be accurately guided by their edges in consequence of their great length and to insure straightness. Hence it is that I have contrived the furnace with trucks mounted on rails or guides for accurately controlling the delivery to and not the receiving of strips from the rolls and also the adjustment of the furnace both forward and backward and laterally, so that once being adjusted for alinement of the strips the alinenent will continue correct no matter how frequently the furnace may be shifted along its controlling-guides. The trucks may of course be fitted to slide on ways instead of rolling on wheels, if desired.

The furnace is to be heated with gas injected together with compressed air and distributed through numerous burners *k* along both sides, the gas and air respectively passing through flexible pipes *l* and *m*, adapted to allow the furnace to be adjusted without disturbing their connections. The gas-hose *l* connects with the metallic gas-pipe *n*, carried underneath the furnace, and the air-hose *m* connects with a tank *o*, also carried beneath the furnace and used for a pressure-regulator. The outlet-pipe $h^2$ of the air-tank *o* connects with the gas-pipe *n* by the T *q* for mixing the air and gas preparatory to entering the furnace through the main pipe *s*, branches *t u*, and the distributing-pipes *v*, the latter forming the connections with the various burners *k*.

The furnace is constructed with an extension *b'* on the end fronting the rolls, by which heat is continuously applied to the strips or bars as they pass to and enter the rolls and while being reduced therein. Said extension is a tapered prolongation reaching to or as far into the gap between the rolls as is practicable and terminating in a contracted guide the upper and lower sides of which are ribbed and grooved metallic pieces *c'*, controlling the upper and lower sides of the strips or bars. The edges of said guide are composed of tapered metallic pieces $d'$ for guiding the strips or bars edgewise and adapted to reach farther into said gap. These edge-guides $d'$ are formed with right-angle flanges $e'$, constructed to bolt on the sides of the extension $b'$, respectively, to hold the guides in position, and with the intermediate liners $f'$ to gage them with proper relation to the width of the strips and to compensate for wear; but other means may be used for adjustment and compensation, if preferred. This guide extension of the furnace is also provided with burners $k$ along the sides and supplied with fuel by the distributing-pipes $v$, suitably extended therefor to continue enveloping the strips or bars in hot gases and flame as they issue from said guide and into the bite of the rolls, thereby excluding air from the strips or bars while being reduced, the opening between the strips or bars and the guide at the issuing end being large enough and of proper shape to prevent the strips or bars from choking off the flame while passing through and to insure the passage of a sufficient quantity of flame to impinge in the bite of the rolls and exclude air. For this purpose the metallic guides $c'$ may have grooves, as $c^3$, Figs. 1 and 9. At the other end of the furnace is an opening $g'$, (dotted in Fig. 2,) through which the strips enter. It is closed by a door $h'$, hinged at $i'$ and having the slots $j'$, in which the strips are inserted when the door is closed for heating. Said slots form guides for the several strips of a "pack" and separate them for circulation of heat. Detachable wearing-pieces $k'$ are attached at one end of the slots, and an adjustable wearing-plate $l'$ is applied to the other end to take the wear of the edges of the strips and being renewable as required.

At intervals along the furnace are spacing-guides $m'$ to keep the several strips of a pack apart to facilitate even and rapid heating of each while passing through the furnace. These guides consist of short rods or tubes, which are inserted through holes in the sides of the furnace and between the strips after the pack is wholly or partially entered, the strips being suitably separated therefor before the slotted door is closed.

A delivery-guide $n'$ is placed at the exit side of the rolls coincidently with the entering guide. It is mounted on a bar $o'$, arranged to slide parallel with the axes of said rolls in supports $p'$ in unison with the lateral movements of the entering guide when the truck $e$, carrying the furnace $b$, is shifted to change the position of the guide relatively to the rolls, as before stated. The bar $o'$ has a toothed rack $q'$ and is geared with a pinion $s'$ on a shaft $t'$, extending under the rolls to the opposite side and there geared by a pinion $u'$ with a toothed bar $v'$, fixed to slide in supports $w'$, parallel with bar $o'$ and having a rigid arm $x'$, which is coupled by its slot $y'$ with a stud $z'$, projecting from the bottom of the furnace, whereby the bar $v'$ is moved with the furnace and causes like movement of the bar $o'$, carrying the guide $n'$. The slot $y'$ of the arm $x'$ and the stud $z'$ are arranged to connect and disconnect automatically when the furnace is moved to or from the mill. Any other mode of gearing the guide $n'$ to traverse in unison with the lateral movements of the furnace may be employed.

As the rolls wear and are dressed from time to time, the working plane between them will be lowered correspondingly. Therefore the support for the end of the furnace next to the rolls is made adjustable to vary the height of the guide extension accordingly. Any approved means for so adjusting it may be provided. In this example I have represented a screw $a^2$, supported on the truck $e$, on which the furnace rests, the other end of the furnace being carried on a rib $c^2$, allowing such adjustment.

In Fig. 7 I represent a pack of strips $a'$ prepared for reduction by a single pass between the rolls, said strips being placed one upon another and temporarily fastened together by rivets or otherwise at the forward ends, so that they may not be displaced relatively to each other while handling or by the rolls in entering. They are arranged one a little in advance of the other, forming a tapered end to the pack, with which the rolls engage more readily than if even and blunt. This arrangement also facilitates separating the strips after they are rolled by visibly locating the plane of cleavage between said strips, which, although prevented from welding together by refractory material distributed on their surfaces, adhere strongly to each other when being parted.

Stepping the ends of the strips and riveting them together, so that they can be passed between the rolls and reduced by a single pass, is one of the most important features of my invention. In order to reduce the plates by a single pass, it is absolutely necessary, where the rolls are set close or very close together, to enter the pack into the bite of the rolls. For this purpose the end of the pack is just thick enough to enter the bite of the rolls, and when this takes place the rest will follow as a matter of course.

While it is old to taper the end of a single bar so that it will enter the bite of the rolls, it is entirely new to step off a pack, fasten their ends together, and then make a heavy reduction by a single pass. In order to reduce the number of plates by a single pass in this manner, it is absolutely necessary not only to step their ends, but to fasten them together, so that the plates will not slip as they enter the rolls.

When the strips or bars are first entered in the furnace, they are allowed to rest a little short of the guide extension until sufficiently heated and then pushed forward between the rolls, which to obtain excessive reductions are revolved slowly that the strips or bars may be given time to attain a mellow heat while passing through the furnace and to afford opportunity for the metal to flow under the squeezing action of the rolls, also to retard the issue on the delivery side of the mill, thereby cooling the product and decreasing oxidation. It will be seen that with the aid of hot gases and a non-oxidizing flame surrounding the strips or bars to exclude air and keep them hot and for heating the rolls the metal so protected will enter the rolls in a soft condition, and a thick quantity retaining high heat into the bite of the rolls may thus be greatly reduced with comparatively low power, ample time being given for the metal to flow, making excessive reductions possible without distortion and injury to the quality of the material; but it is to be noted that owing to the slow movement of the bar or pack into the rolls it is of the greatest importance to exclude air until the reduction takes place, because oxidation would result in a large percentage of loss, the strips being very thin, besides being greatly detrimental to the quality of the product. My invention is distinguished in this respect from other apparatus in which the work is heated preparatory to entering the rolls, in all of which, so far as I know, there is exposure of the metal to the air after issuing from the furnace and before entering the rolls.

While this invention is alike applicable to rolling single bars or packs, it will be seen that it is especially advantageous for producing very thin strips in packs, as a pack of strips may be reduced together to about the same gage as is possible to roll a single bar, because whether single or in multiple there is a limit in thickness to which hot rolling may be economically carried before the metal becomes chilled and hardened, thereby losing its malleability and causing undue wear and breakage of the rolls.

I claim—

1. The combination with a rolling-mill, of a furnace adapted to heat strips or bars while being fed into the rolls, and edge-guides for directing the strips through the rolls, the furnace being adjustable back and forth at right angles to the rolls, and controlled in said adjustment by tracks or guides substantially as described.

2. The combination with a rolling-mill, of a furnace adapted to heat strips or bars while being fed into the rolls and edge-guides, for directing the strips through the rolls, the furnace being adjustable laterally and parallel with the axes of the rolls and controlled in said adjustment by tracks or guides, substantially as described.

3. The combination with a rolling-mill, of a furnace adapted to heat strips or bars while being fed into the rolls and edge-guides for directing the strips through the rolls, the furnace being adjustable both at right angles to, and parallel with the axes of the rolls and controlled in said adjustments by tracks or guides substantially as described.

4. The combination of a rolling-mill, a furnace for heating strips or bars while being fed into the rolls, and an air-excluding feedway for the strips extending from the body of the furnace to close proximity with the rolls and thereby adapted to continue the application of hot gases and flame to the point of reduction and between the rolls, also to exclude air from the passing strips or bars, also to keep them hot, and also to heat the rolls, substantially as described.

5. The combination with a rolling-mill, of a furnace adapted to heat strips, or bars while being fed into the rolls, the feedway prolongation of said furnace extending to or into the gap between the rolls, and the edge-guides for controlling the alinement of the strips, said furnace and feedway being mounted on a truck or guides and thereon movable up to and away from the rolls substantially as described.

6. The combination with a rolling-mill, of a furnace adapted to heat strips or bars while being fed into the rolls, and the feedway prolongation of said furnace extending to or into the gap between the rolls, the furnace being adjustable laterally and parallel with the axes of the rolls on trucks or guides substantially as described.

7. The combination with a rolling-mill, of a furnace adapted to heat strips or bars while being fed into the rolls, and the feedway prolongation of said furnace extending to or into the gap between the rolls, the furnace being mounted on a truck or guides and thereon movable up to and away from the rolls and also back and forth laterally to the rolls substantially as described.

8. The combination with a rolling-mill, of a furnace adapted to heat strips or bars while being fed into the rolls, of the feedway prolongation of said furnace extending to or into the gap between the rolls, and guide attachments to the mouth of said feedway, substantially as described.

9. The combination with the mouth extremity of the feedway prolongation of the furnace, and with the rolls, of the tapered edge-guides for the strips or bars detachably connected with the sides of said feedway, and intermediate means of adjustment, substantially as described.

10. The combination with the inlet-opening in one end of the furnace for the strips or bars, of the horizontally-moving door for access to the furnace having the separating and guiding slots in the opening and closing edge, substantially as described.

11. The combination with the inlet-opening in one end of the furnace for the strips or bars, of the door having the separating and guiding slots, and the detachable and adjustable edge-guides, located relatively to said slots for guiding the strips and sustaining the wear of the strips substantially as described.

12. The combination with a furnace adapted to heat strips or bars while being fed into the rolls, of the cross-guides for separating the strips or bars, removably inserted in holes in the sides of the furnace substantially as described.

13. The combination with a rolling-mill, of a furnace adapted to heat strips or bars while being fed into the rolls and being movable laterally to the rolls, and a discharging-guide for the rolled product coupled with the furnace coincidently with the feeding-guide and movable laterally in unison therewith, substantially as described.

14. The combination with a rolling-mill, of a furnace adapted to heat strips or bars while being fed into the rolls and being movable laterally to said rolls, the discharging-guide for the rolled product, the laterally-sliding support for said guide, the laterally-sliding bar coupled to said furnace, and the gear connecting said bars for synchronous action, substantially as described.

15. The combination with a rolling-mill, of a furnace adapted to heat strips or bars while being fed into the rolls and being removable laterally to said rolls, and also forward and backward thereto, the discharge-guide for the rolled product, the laterally-sliding support for said guide, the laterally-sliding bar coupled to said furnace, and the gear connecting said bars for synchronous action, the connecting devices of said bar with the furnace being adapted for automatic connection and disconnection through moving the furnace up to and away from the rolls, substantially as described.

16. The combination with the rolls and the guide extension of the furnace, of the metallic guide-pieces in the mouth of said extension having grooves for gases substantially as described.

Signed at New York city this 15th day of April, 1901.

THOMAS V. ALLIS.

Witnesses:
CHAS. W. FORBES,
JOHN SMITH, Jr.